United States Patent [15] 3,703,251

Suzuki [45] Nov. 21, 1972

[54] MAGNETIC TAPE MAGAZINE PLAYING DEVICE

[72] Inventor: Michio Suzuki, Tokyo, Japan

[73] Assignee: Pioneer Electronic Corporation, Tokyo, Japan

[22] Filed: Dec. 29, 1970

[21] Appl. No.: 102,467

[30] Foreign Application Priority Data

Dec. 29, 1969 Japan ........................44/2089

[52] U.S. Cl. .....................................226/90, 274/4 G

[51] Int. Cl. ...........................................G11b 15/29

[58] Field of Search .........274/11 B, 4 B, 4 G; 226/90

[56] References Cited

UNITED STATES PATENTS

| | | | |
|---|---|---|---|
| 3,348,750 | 10/1967 | Nieland | 226/90 |
| 3,269,625 | 8/1966 | Nieland et al. | 226/90 |
| 3,486,675 | 12/1969 | Krechman | 274/4 G |
| 3,420,461 | 1/1969 | Cousino | 274/11 B |
| 3,492,005 | 1/1970 | Yoshihiro et al. | 274/4 B |

*Primary Examiner*—Allen N. Knowles
*Attorney*—Sughrue, Rothwell, Mion, Zinn & Macpeak

[57] ABSTRACT

A magnetic tape magazine playing device which has a rotatable lever having a pinch roller attached to one end thereof, an operating lever having a claw for pressing one end of the rotatable lever and constructed so that the interval between the pinch roller and a capstan is substantially the same as the stroke of the operating lever. Also, electric contacts are provided which function so that one group of electric contacts close so as to rotate only the capstan upon the former half stroke of the operating lever and the other group of electric contacts close upon the latter half stroke of the operating lever so that the pinch roller contacts the capstan substantially simultaneously upon the closure of the other electric contacts.

6 Claims, 5 Drawing Figures

INVENTOR
MICHIO SUZUKI
BY Sughrue, Rothwell, Mion,
Zinn & Macpeak
ATTORNEYS

MAGNETIC TAPE MAGAZINE PLAYING DEVICE

BACKGROUND OF THE INVENTION

This invention relates to a magnetic tape magazine playing device, and more particularly to an improvement in the operating mechanism for the tape magazine playing device adapted to simultaneously rotate the capstan, close the magnetic head switching circuit and magazine indicating circuit, and contact the pinch roller with the capstan therein.

In order to stop the operation of a playing device for an endless cartridge or tape magazine, when the playing operation of the playing device has finished, it is necessary to release the pinch roller for feeding the magnetic tape from the capstan in the device, and accordingly, in many cases, it is necessary to release the cartridge or magazine from its attached state. At the same time, it is sometimes also necessary to open the circuit of a drive motor and to stop the operation of the playing device. However, in the case where a number of magnetic tape magazines are provided in the device so that any one of the magazines may be selected, the magazines which are not used must be drawn out every time in selection, resulting in very complicated operation which makes the playing device very inconvenient in its utilization.

SUMMARY OF THE INVENTION

This invention contemplates the elimination of the aforementioned disadvantages of the conventional magnetic tape cartridge or magazine playing device, by providing a novel and improved magnetic tape magazine playing device in which wow and flutter are eliminated and a magnetic tape need not be taken out.

It is an object of the present invention to provide a magnetic tape magazine playing device which is adapted to simultaneously rotate the capstan, close the magnetic head switching circuit and magazine indicating circuit and contact the pinch roller with the capstan therein.

It is another object of this invention to provide a magnetic tape magazine playing device which is economical, simple in construction and accurate and quick in operation.

Briefly, according to the present invention, the foregoing and other objects are, in one aspect, attained by the provision of a magnetic tape magazine playing device which comprises a rotatable lever including a pinch roller attached to one end thereof, an operating lever including a claw for pressing one end of the rotatable lever and constructed so that the interval between the pinch roller and a capstan is substantially the same as the stroke of the operating lever, and also including electric contacts functioning so that one group of electric contacts close so as to rotate only the capstan upon the former half stroke of the operating lever and another group of electric contacts close upon the latter half stroke of the operating lever so that the pinch roller contacts the capstan substantially simultaneously upon the closure of the other electric contacts.

Thus, when a number of magnetic tape magazines each having a pinch roller at one end of the rotatable lever are attached to the magnetic tape magazine playing device, the pinch roller is pressed by the claw of the operating lever corresponding to the magazine to be released from the capstan, and thus all magazines are held at first out of playing condition, and then if a desired push-button of the playing magazine is pressed, the corresponding pinch roller is contacted to the capstan so as to play the magazine. When the magazine is finished, if another push-button is pressed, the magazine completely played is released from the lock with the playing device to a non-playing condition. Then, the pinch roller of the selected magazine is contacted with the capstan with the consequent result that the magnetic tape in the magazine is played. In this case, as the operating lever is pushed forwardly through the selected pushbutton, the drive motor is at first driven so as to rotate the pinch roller, and then the magnetic head switching circuit and the magazine indicating circuit are closed. At the same time or immediately thereafter, as the claw is separated from the pinch roller, the pinch roller is pressed on the capstan by a reset spring to run the tape, and accordingly one-half of the operation of the operating lever may simultaneously rotate the capstan by the rotation of the drive motor, close the magnetic head switching circuit and magazine indicating circuit, and contact the pinch roller onto the capstan substantially instantaneously, with a simple construction and operation.

BRIEF DESCRIPTION OF THE DRAWINGS

A more complete appreciation of the invention will be readily obtained as the same becomes better understood by reference to the following detailed description when taken in conjunction with the accompanying drawings, wherein.

DESCRIPTION OF THE PREFERRED EMBODIMENT

Figure 1:
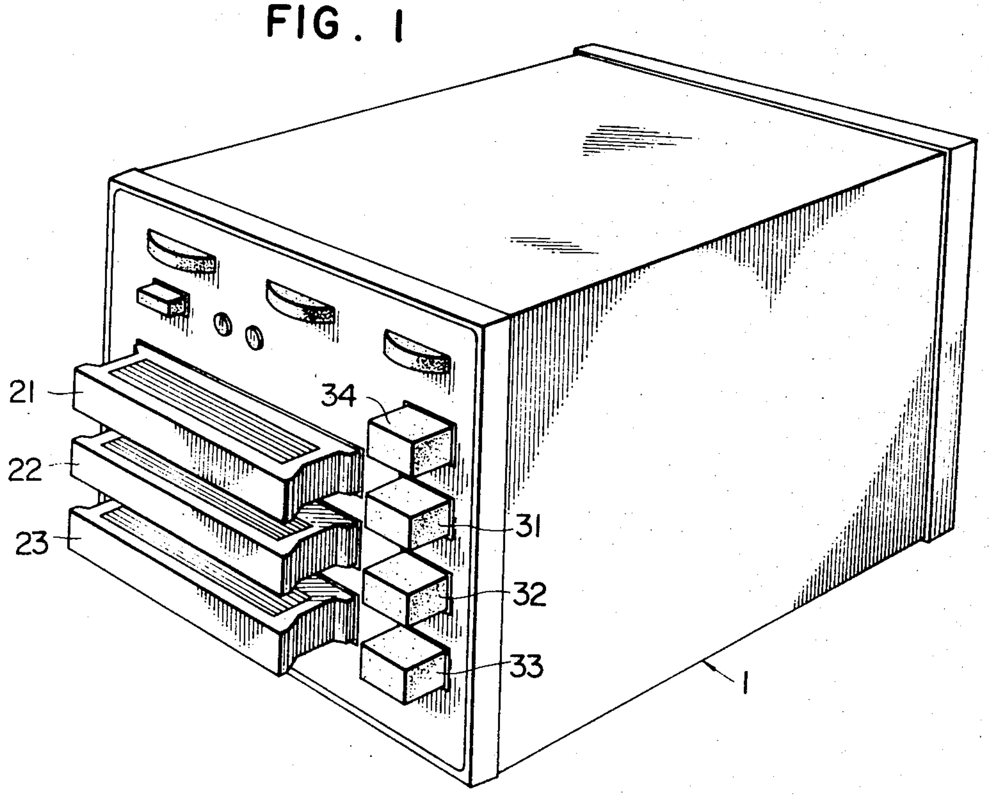
FIG. 1 is a perspective view of a magnetic tape magazine playing device of this invention.

One embodiment of the invention will now be described with reference to the drawings, and particularly to FIGS. 1 and 2, which show the appearance and inner construction of the playing device of this invention.

Reference numeral 1 illustrates a magnetic tape magazine playing device of this invention; 21, 22 and 23 are three magnetic tape magazines attached to the playing device; 31, 32 and 33 are selecting push-buttons corresponding to the respective magnetic tape magazines; 34 is a stop button; and 4 is a panel or base of the playing device 1. If the magazine 22 is inserted along the guide side walls 5 and 5' provided on the base 4, the magazine 22 is locked in such a manner that lock springs 7 and 7' provided on the walls enter the lock holes 6 and 6' provided on both side walls. Whereupon, as an operating rod 10 is pushed against an operating lever 8 having the selecting button 32 by the forces of the reset spring 9 and the reset spring 39, as will be hereinafter described, in the direction opposite to the insertion of the magazine, the claw 11 of the operating lever 8 pushes a pressable end 13 provided at one end of a rotatable lever 12 pivotally supported on the bottom of the magazine 22 against the force of a reset spring 14 to release a pinch roller 15 provided at one end of the lever from a capstan 16 so as to prevent operation or playing of the magazine 22. The same construction and operation applies to the other magazines 21 and 23. In this case, the respective contacts 17, 17', 18, 18' and 19, 19' of a power circuit, magnetic head switching circuit and magazine indicating circuit are all open, and the playing device is not operated.

Figure 3:
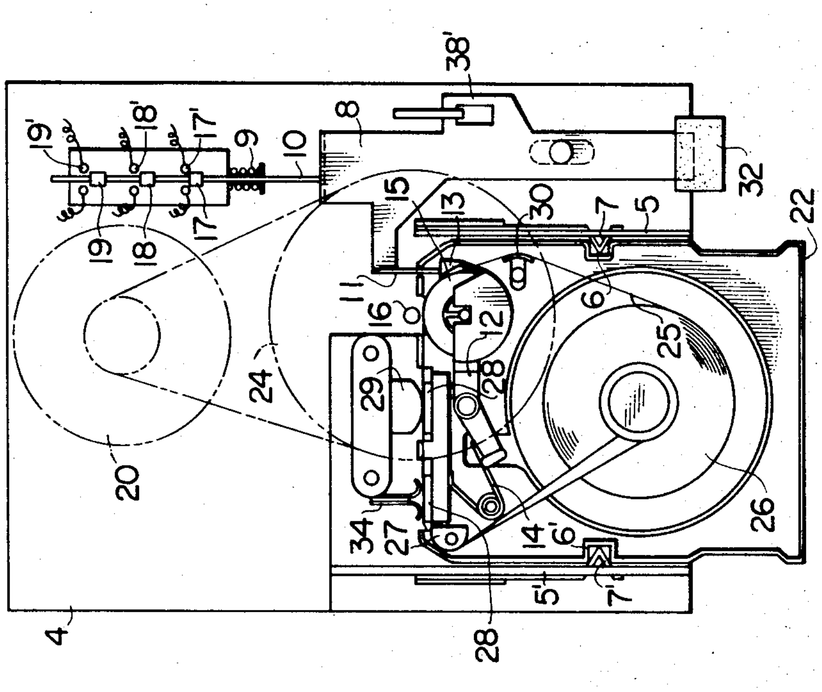
FIG. 3 is a plan view of the playing device in which the magnetic tape magazine is ready to be played.
Figure 2:
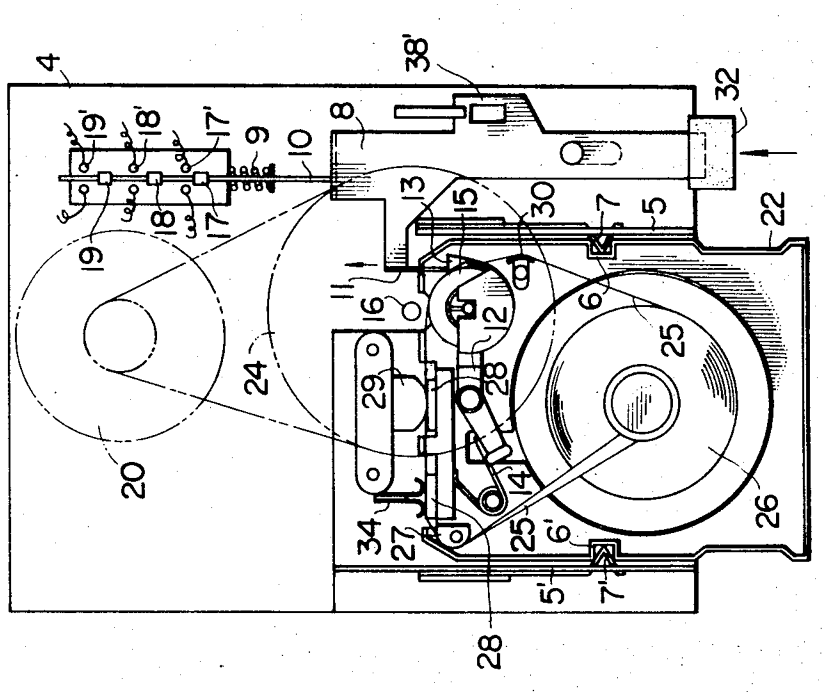
FIG. 2 is a plan view of the playing device, with parts broken away, in which one magnetic tape magazine is attached thereto.

Reference is now made to FIG. 2, which shows the playing device wherein one magnetic tape magazine is attached. In order to start playing the device, if the push-button switch 32 is pressed in the direction shown by an arrow, since the distance between the switches 17 and 17' of the power circuit is so constructed as to be approximately one-half of the distance between the switches 18 and 18' in the magnetic head switching circuit and between the switches 19 and 19' in the magazine indicating circuit, in the former half stroke of the operating lever 8 the contacts 17 and 17' are closed so that a drive motor 20 is rotated and accordingly a flywheel 24 interlocked thereto is rotated and the capstan 16 bearing on the motor shaft is also rotated with the consequent result that the playing device is started. At that time, the claw 11 projecting from the side end of the operating lever 8 moves in the direction as shown by an arrow. Since the pressable end 13 also moves in the direction shown by an arrow under the force of the spring 14, it is held in contact with the claw 11. Since the distance between the capstan 16 and pinch roller 15 is so constructed as to be substantially the same as the stroke of the operating lever 8, the pinch roller 15 is not yet contacted with the capstan 16 as shown in FIG. 3, which shows the playing device in which the magnetic tape magazine is ready for playing. Accordingly, the tape 25 in the magazine 22 is not yet fed.

If the push-button switch 32 is further pushed, in the latter half stroke of the operating rod 10 the contacts 17 and 17' continue to contact with each other, while the contacts 18, 18' and 19, 19' contact substantially simultaneously upon completion of the stroke of the operating lever or immediately before or after that, and at substantially the same time the pinch roller 15 contacts the capstan 16.

Figure 5:
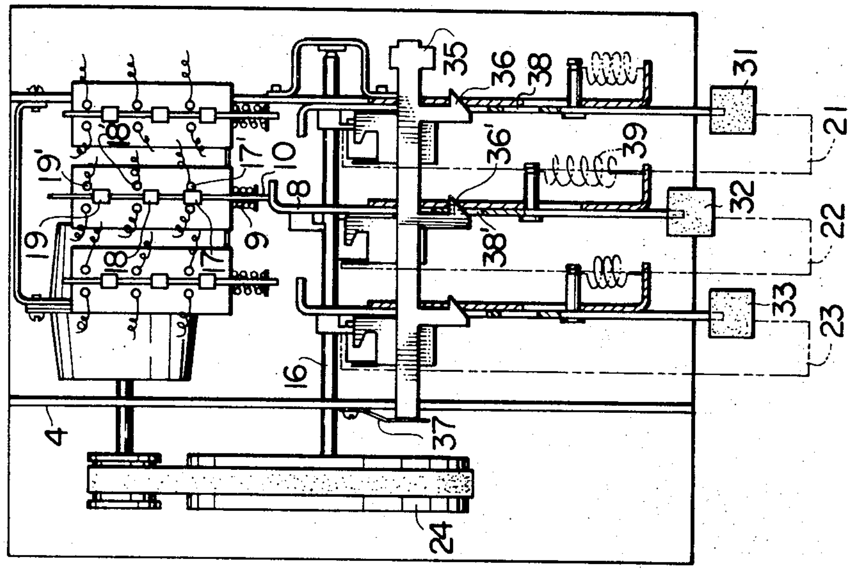
FIG. 5 is a side view showing the state of the operating lever when playing and when there is no operation.
Figure 4:
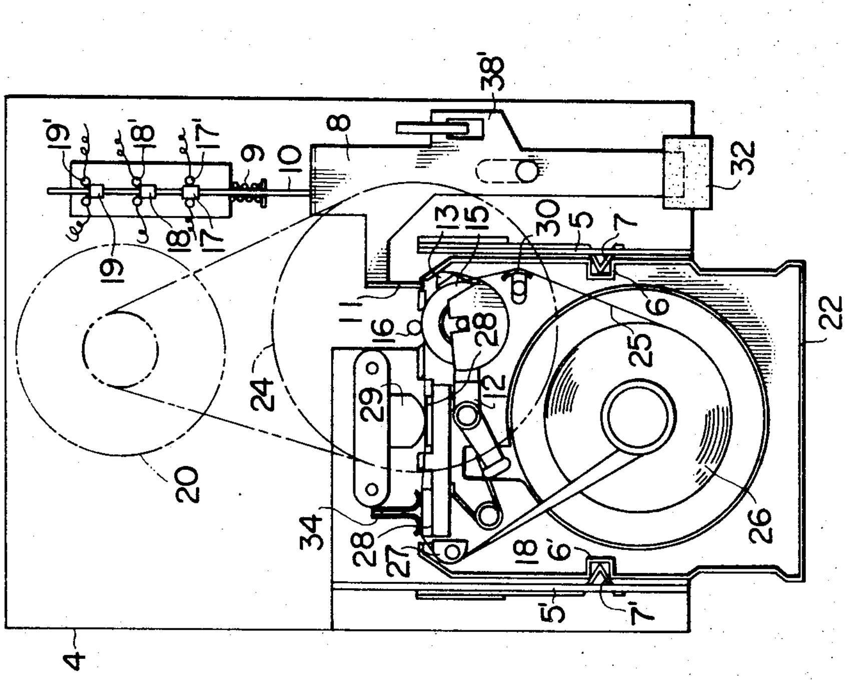
FIG. 4 is a plan view of the playing device in which the magnetic tape in the magazine is being played.

Thus, as shown in FIG. 4, which shows the playing device when the magnetic tape in the magazine is in playing condition, the tape 25 runs from its wound reel 26 through a guide 27, pad 28, magnetic head 29 and through a guide 30 back to the reel 26. If the tape completely runs so that a sensing foil (not shown) on the end of the tape contacts a contact pole 34, the track of the tape is switched. If the magazine 22 has played all of the tracks, upon pressing of the push-button 31 so as to play the next magazine, the operating lever 8 pushes the oblique end 36 of the lock lever 35 as shown in FIG. 5, and accordingly the lock lever 35 is lowered against the force of the spring 37, but the claw of the oblique end 36 enters again a stop hole 38 under the tension of the spring 37, with the consequent result that it locks the magazine 21 at the same time the claw of the oblique end 36' corresponding to the magazine 22 is released from the engagement of the stop hole 38', so that the operating lever 8 returns to the position before operation by the action of the reset spring 39. Accordingly, the claw 11 of the operating lever 8 again pushes the pressable end 13 of the rotatable lever 12 having the pinch roller 15 at its one end against the spring 14, with the consequent result that the pinch roller 15 is released from the capstan 16 so as to stop the tape.

It should be understood from the foregoing description that since the magnetic tape magazine playing device of this invention has a number of magazines inserted thereinto simultaneously, any one of the magazines attached thereto may be played without taking out any of the others, by merely operating a selecting button to rotate the capstan and then to close the magnetic head switching circuit and magazine indicating circuit at the same time constructed so as to contact the pinch roller onto the capstan. This prevents the wow and flutter or taking out of the tape to protect it from defects in comparison with the conventional playing devices which rotate the rotatable lever having a pinch roller together with the operation of the operating lever simultaneously rotating the capstan to be depressed on the pinch roller to run the tape.

I claim:

1. A multiple magnetic tape magazine playing device comprising:

a plurality of spaced, parallel magazine receiving areas within said device, capstan means for driving the tapes of respective magazines, an electrical motor coupled to a source of electricity for driving said capstan means, magazines carried within respective areas, each magazine carrying a pivotable lever including a pinch roller movable towards said capstan means, means for spring biasing said pinch roller towards said rotatable capstan to drive the tapes in respective magazines, an operating lever for each cartridge and positioned within said playing device for sliding in a longitudinal direction under a bias, means carried by said operating lever for contacting said pivotable lever to move said lever under said bias in a direction releasing said pinch roller from said capstan, a stop hole carried by said operating lever, said operating lever being positioned relative to said pivotable lever such that the gap between the pinch roller and the capstan is substantially the same as the stroke of the operating lever, a plurality of electrical contact means operatively associated with said operating lever, such that one pair of electrical contacts closes during the first half stroke of the operating lever and another pair of electrical contacts closes upon the last half stroke of said operating lever, means electrically connecting said first set of contacts with said capstan means drive motor and said source such that the capstan drive is initiated upon the first half stroke of said operating lever, said other set of electric contacts being closed simultaneously with the pinch roller contacting the capstan during the second half stroke of the operating lever, a lock lever carried by said device and slidable perpendicular to the plane of movement of said operating levers for respective magazines and common thereto, spring biasing means for spring biasing said lock lever in a direction tending to hook said lock lever into a stop hole of one of said operating levers in recording or reproducing position, subsequent to sliding of said operating lever in a direction toward said pivotable lever.

2. The multiple magnetic tape magazine playing device as claimed in claim 1, further comprising: spring means operatively associated with each of said magazines for resiliently holding said cartridges in standby, inserted position for recording or reproducing upon full insertion of the same.

3. The multiple magnetic tape magazine playing device as claimed in claim 4, wherein: said contact means comprises:

a plurality of axially spaced, fixed contacts, a movable contact support rod slidably positioned for movement relative to said spaced fixed contacts and carrying at spaced locations contacts thereon for movement respectively into contact with said fixed contacts, means spring biasing said rod towards open contact position, and means carried by said operating lever for contacting said associated movable contact carrying rod and for sequentially closing said contacts by movement of said rod against the bias of said coil spring.

4. A multiple magnetic tape magazine playing device comprising:

means defining a plurality of spaced parallel magazine receiving cavities, magazines insertably received therein, capstan drive means carried by said device including an energizable electric motor, each of said magazines carrying a pivotable lever supporting a pinch roller on one side of the pivot axis thereof, spring biasing means acting on said pivotable lever for biasing said pinch roller towards said capstan for driving magazine carrying tapes, a reciprocating operating lever for each magazine slidably positioned within said device, means carried by said operating lever for respectively contacting a pivotable lever within a magazine to limit movement of said pivotable lever in a direction towards said capstan means, pin and slot means carried by said tape playing device and said operating lever for limiting the sliding motion of each operating lever, spring biasing means carried by said device for biasing each operating lever to one end of said slot and to thereby release said pinch roller from said capstan drive means, a stop hole within each operating lever, a common locking lever slidably mounted within said device for movement at right angles to the longitudinal axis of said operating levers and extending across the same, individual hook means carried by said lock lever an engageable respectively with said stop holes for said operating levers, means biasing said lock lever towards hook engaging position, said stop holes being located such that the gap between the pinch roller and the capstan is essentially the same as the stroke of the operating lever, a plurality of electrical switches operatively associated with each operating lever and responsive to sliding movement of said operating lever of sequential closing of the same, said switches being positioned with contacting to said operating lever such that a first pair of contacts close upon the first half stroke of said operating lever and a second pair of contacts close upon the second half stroke of said operating lever, circuit means coupling said first pair of contacts to said capstan drive means electric motor, whereby, during sliding of a given operating lever against its bias, the capstan is energized subsequent to completion of a half stroke of said operating lever and subsequently at the end of the latter half stroke, the pinch roller contacts the rotating capstan simultaneously with the closure of the other electrical contacts, said lock lever releases a prior lock operating lever and a hook associated with the operating lever now moved to full stroke position, locks the same to maintain the pinch roller in tape drive position against the capstan means.

5. The multiple magnetic tape magazine playing device as claimed in claim 4, wherein each operating lever is slidably mounted to one side respectively of its associated magazine, said means contacting said pivotable lever comprises an arm extending outwardly of said operating lever, overlying the end of said inserted cartridge and contacting said pivotable lever to the same side of the pivot axis as said pinch roller, said plurality of electric switches comprise a plurality of axially spaced, fixed pairs of contacts, a rod mounted for reciprocation at right angles to the plane of said spaced stationary contacts, movable contact means fixed to said rod and movable therewith for sequentially contacting respective pairs of fixed contacts, spring biasing means operatively associated with said rod and tending to maintain said rod in switch open position, and means carried by said operating lever for contacting one and of said associated rod for moving said rod axially against the bias of said spring means to sequentially close said contacts.

6. The multiple magnetic tape magazine playing device as claimed in claim 5, wherein each cartridge includes lock holes on opposed side walls thereof, and said device further comprises locking springs mounted for movement into said lock holes to hold said cartridge in standby position permitting recording or reproducing subsequent to insertion of said cartridge into its magazine receiving cavity.

* * * * *